Feb. 16, 1971 L. MICHAEL Re. 27,067

BASKETBALL NET ANTI-WHIP DEVICE

Original Filed Oct. 19, 1964

Larry Michael

INVENTOR.

BY Clarence A. O'Brien and Harvey B. Jacobson

Attorneys

United States Patent Office

Re. 27,067
Reissued Feb. 16, 1971

27,067

BASKETBALL NET ANTI-WHIP DEVICE

Larry Michael, 229 W. North St., Ada, Ohio 45810

Original No. 3,313,539, dated Apr. 11, 1967, Ser. No. 404,587, Oct. 19, 1964. Application for reissue Mar. 24, 1969, Ser. No. 835,833

Int. Cl. A63b *63/00*

U.S. Cl. 273—1.5 13 Claims

Matter enclosed in heavy brackets [ ] appears in the original patent but forms no part of this reissue specification; matter printed in italics indicates the additions made by reissue.

*ABSTRACT OF THE DISCLOSURE*

*A conventional basketball net having stiffening means cooperating therewith to prevent whipping of the net over the support ring.*

This invention relates to an attachment for a conventional basketball net of the type including a supporting ring and a generally vertically disposed and cylindrical basketball net dependingly supported from the ring by means of upstanding vertically elongated leg portions which are attached at their upper ends to the supporting ring at points spaced circumferentially thereabout.

Conventional basketball nets are constructed of cord woven or tied into a net-like structure which is generally cylindrical in configuration and which has a minimum diameter substantially equaling the diameter of a basketball.

When a basketball goal is made and the ball passes through the supporting ring without touching the latter, the ball will at least lightly brush the inner surfaces of the generally cylindrical net dependingly supported from the support ring and cause the net to momentarily check the speed of the basketball. In addition, the engagement of the basketball with the net causes the net to move visually and accordingly, these two visual signs, the movement of the net and the momentary checking of the speed of the basketball, assist in accurately determining whether or not a goal has been made.

While the aforementioned conventional type of basketball net is completely satisfactory in its operation to assist the officials of a basketball game in determining when a goal has been made, the nets are of a length sufficient to enable the lower ends thereof to be swung upwardly and over the edge of the supporting ring. This type of movement of the lower end of the net up and over the supporting ring can be caused by players accidentally hitting the net when jumping for a free ball and also in some instances when a ball passes through the net at high speed, the momentary speed checking action of the net on the basketball causing the net to be elongated whereupon, after the ball has passed through the net, the normal tendency of the net to return to its normal length will snap the lower end of the net up and over the supporting ring where it remains until released.

Many different types of basketball nets have been designed toward providing a net which will be incapable of having its lower end whipped up and over the supporting ring. However, these prior attempts at providing an improved net have included the provision of nets constructed of metal links, synthetic materials such as plastics and vinyl [rosins] *resins,* and various other types of materials. However, it has been found that the conventional type of basketball net constructed of lightweight cord or the like operates in a more efficient manner and accordingly, the main object of this invention is to provide a basketball net of the usual cord construction but including means whereby the net will be incapable of being whipped up and over the ring of the goal.

Another very important object of this invention, in accordance with the immediately preceding object, is to provide an improved basketball net which will retain the same operating characteristics of a conventional cord-type net.

Still another object of this invention is to provide an attachment constructed in accordance with the present invention and which may be readily secured to existing cord-type basketball nets so as to modify the latter in accordance with the present invention and to thereby eliminate the necessity of replacement of existing basketball nets in order to practice the present invention.

A further important object of this invention is to provide an attachment for a basketball net in accordance with the present invention and constructed in a manner whereby the attachment will lengthen the life expectancy of the modified basketball net.

A final object of this invention to be specifically enumerated herein is to provide a basketball net anti-whip attachment in accordance with the preceding objects which will conform to conventional forms of manufacture, be of simple construction and easy to install so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
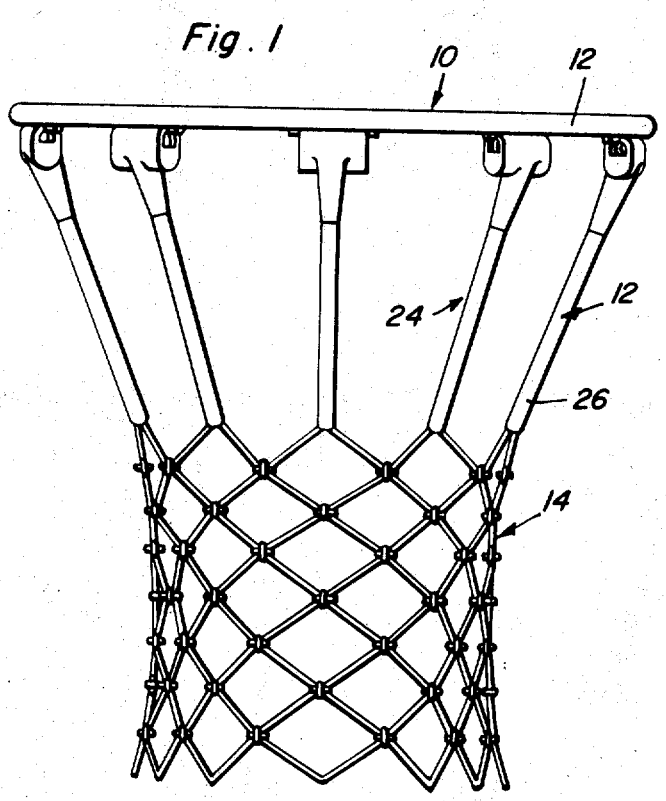
FIG. 1 is a front elevational view of a conventional form of basketball goal including the usual horizontal net support ring and the upright generally cylindrical cord-type net which is dependingly supported from the net support ring and shown with one form of the attachment of the instant invention operatively connected thereto.

Referring now more specifically to the drawings, the numeral 10 generally designates a conventional form of basketball goal including a support ring 12 which is generally horizontally disposed and may be supported from a conventional backboard (not shown) in any convenient manner.

The goal 10 also includes a cord-like net which is generally cylindrical in configuration and referred to by the reference numeral 14. The net 14 includes a plurality of upstanding vertically elongated loops 16 which are closed at their upper ends and secured to the corresponding net supporting hooks 18 dependingly supported from the ring 12 at points spaced circumferentially thereabout.

The loops 16 each include a pair of upstanding legs 20 and 22 which are interconnected at their upper ends by means of a bight portion 23. The bight portions 23 are engaged with the supporting hooks 18 and in this manner the net 14 is supported from the ring 12.

Figure 2:
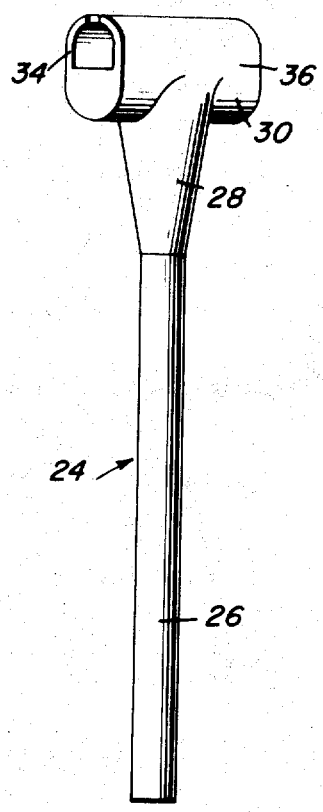
FIG. 2 is a perspective view of one of the tubular members which, in a set of an appropriate number comprise the attachment of the instant invention.
Figure 3:
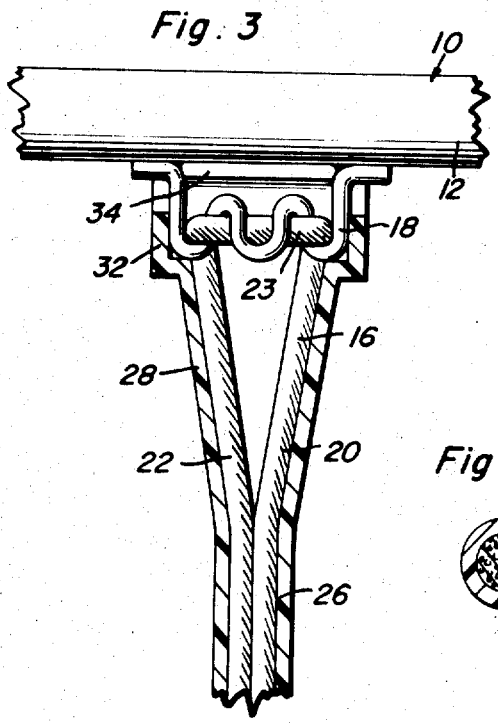
FIG. 3 is an enlarged front elevational view of the center portion of the goal illustrated in FIG. 1 of the drawings with the associated tubular member of the instant invention shown in longitudinal vertical section and with parts of the support ring and net being broken away.

One form of the basketball net anti-whip device of the instant invention is illustrated in FIGS. 1–3 of the drawings and is generally designated by the reference numeral 24. The anti-whip device or attachment 24 comprises a plurality of generally tubular members 26 which include flared end portions 28 and laterally enlarged terminal end head portions 30.

The head portions 30 define split clamp portions 32 which each include a pair of resilient clamp halves 34 and 36.

When installing the tubular members 26 on the net 14, each loop 16 is first disengaged with its corresponding support hook 18 and then telescoped upwardly through the lower end of the corresponding tubular member 26 and engaged with the corresponding support hook 18. Then, the split clamp 32 thereof may be engaged with the hook 18 so as to enclose the latter. Each of the tubular members 26 is installed in this manner and it may be seen that each tubular member 26 encloses a major portion of the length of each pair of corresponding legs 20 and 22. The length of the tubular members 26 is sufficient to prevent the lower portion of the net 14 from slipping upwardly and over the ring 12 and accordingly, it may be seen that this type of whipping action of the net 14 will be eliminated. Further, the tubular members 26 are disposed above the minor diameter portion of the net 14 and therefore do not interfere with the basketball speed checking operation of the net 14.

Figure 4:
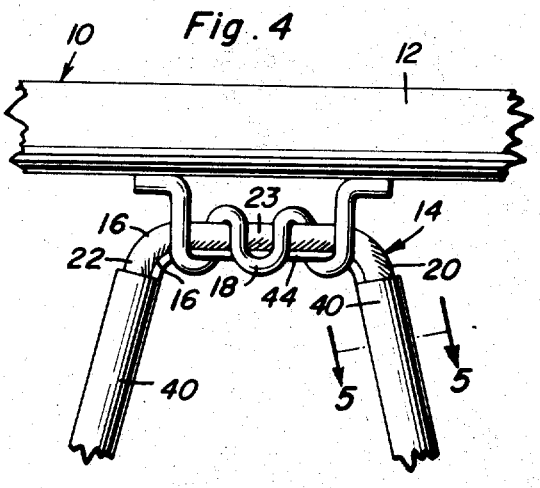
FIG. 4 is a fragmentary front elevational view similar to that of FIG. 3 but showing a modified form of anti-whip attachment.
Figure 5:
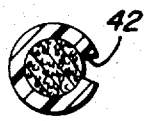
FIG. 5 is an enlarged generally horizontal sectional view taken substantially upon the plane indicated by the section line 5—5 of FIG. 4.

With attention now directed more specifically to FIG. 4 of the drawings there will be seen a modified form of tubular member 40 which is longitudinally slotted as at 42. Each of the tubular members 40 may be laterally advanced toward engagement with the corresponding leg. However, it will be noted that the tubular members 40 of each adjacent pair of tubular members which singly enclose the legs 20 and 22 of the corresponding loop 16, are interconnected by means of an integral bight portion 44. This bight portion 44 underlies the bight portion 23 of the associated loop 16 and accordingly reduces any chafing action between the bight portion 23 and the corresponding depending hook 18. Accordingly, when it is desired to apply the modified form of attachment to the basketball net 14, each loop 16 is disengaged from its supporting hook 18 and then the tubular members 40 are clamped about the legs 20 and 22 with the bight portion 44 underlying the bight portion 23. Then, the two bight portions 23 and 44 may again be engaged with the supporting hook 18 in the conventional manner as shown in FIG. 4 of the drawings.

The operation of the tubular members 40 is substantially identical to the tubular members 26 expecting that there will of course be twice the number of tubular members 40 than tubular members 26.

The tubular members 26 and 40 may be constructed of any suitable flexible but relatively stiff material such as plastic and may therefore also serve to prevent a basketball from chafing the legs 20 and 22 of the loops 16. The split clamps 32 may also include portions which enclose the adjacent portion of the ring 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed is:

1. In combination with a basketball net supporting ring having a conventional generally vertically disposed and cylindrical basketball net dependingly supported therefrom, said net including upstanding vertically elongated and circumferentially spaced loops, the upper ends of said loops being closed and attached to said ring at points spaced circumferentially thereabout, said loops each defining a pair of upright legs interconnected at their upper ends, an anti-whip attachment for said net, said attachment including a plurality of flexible but somewhat stiff tubular members telescoped over at least certain of said upright legs and enclosing said certain of said legs throughout at least a major portion of their vertical length.

2. The combination of claim 1 wherein said tubular members are telescoped over all of said upright legs.

3. The combination of claim 1 wherein at least some of said tubular members are each telescoped over both legs of the corresponding loop.

4. The combination of claim 3 wherein each of said tubular members is telescoped over both legs of the corresponding loop.

5. The combination of claim 4 wherein each loop has one of said tubular members telescoped over both legs thereof.

6. In combination with a basketball net supporting ring having a conventional generally vertically disposed and cylindrical basketball net of the type including upright vertically elongated and circumferentially spaced legs, the upper ends of said legs being attached to said ring at points spaced circumferentially thereabout, an anti-whip attachment for said net, said attachment including a plurality of flexible but somewhat stiff tubular members telescoped over at least certain of said upright legs and enclosing said certain of said legs throughout at least a major portion of their vertical length.

7. The combination of claim 6 wherein said tubular members enclose at least a major portion of each of said certain of said legs.

8. The combination of claim 1 wherein said [loop] *ring* includes a plurality of circumferentially spaced depending hooks to which the upper ends of said tubular members including enlarged terminal end portions snugly embracing and at least partially enclosing said hooks.

9. The combination of claim 1 wherein said tubular members are longitudinally slit so as to be adapted to be laterally advanced toward engagement and away from engagement with said certain of said legs.

*10. In combination, a basketball net support ring, a basketball net formed of cord and attached to said support ring, means exterior of said cord cooperating with said net to produce sufficient stiffness in a portion of said net to prevent said net from whipping over said support ring when a basketball passes through said net.*

*11. The combination according to claim 10 in which said means exterior includes means to attach said means exterior to said support ring*

*12. A combination according to claim 10 in which said means exterior cooperates with only the upper portion of said net.*

*13. In combination, a basketball net support ring, a basketball net formed of cord and attached to said support ring, means cooperating with only the upper portion of said net to prevent said net with whipping over said support ring when a basketball passes through said net.*

References Cited

The following references, cited by the Examiner, are of record in the patented file of this patent or the original patent.

UNITED STATES PATENTS

| | | | |
|---|---|---|---|
| 2,199,609 | 5/1940 | Bennett | 273—1.5 |
| 2,579,312 | 12/1951 | Garvey | 273—1.5 |
| 2,916,288 | 12/1959 | Chervenka | 273—1.5 |
| 3,109,647 | 11/1963 | Austin | 273—1.5 |

RICHARD C. PINKHAM, Primary Examiner

P. E. SHAPIRO, Assistant Examiner